United States Patent [19]

Yokoyama

[11] Patent Number: 5,140,513
[45] Date of Patent: Aug. 18, 1992

[54] SWITCHING REGULATED DC-DC CONVERTER USING VARIABLE CAPACITY DIODES IN THE FEEDBACK CIRCUIT

[75] Inventor: Kenji Yokoyama, Hamamatsu, Japan

[73] Assignee: Yamaha Corporation, Hamamatsu, Japan

[21] Appl. No.: 738,143

[22] Filed: Jul. 30, 1991

[30] Foreign Application Priority Data

Jul. 31, 1990 [JP] Japan .................. 2-203021

[51] Int. Cl.$^5$ ............................. H02M 3/337
[52] U.S. Cl. .............................. 363/26; 363/56
[58] Field of Search .............. 363/25, 26, 56, 134

[56] References Cited

U.S. PATENT DOCUMENTS 4,027,228 5/1977 Collins .
4,155,113 5/1979 Simmons ................. 363/56
4,829,415 5/1989 Haferl ................... 363/26

OTHER PUBLICATIONS

Japanese Data Sheet for a Product μPC494 of NEC (1988).

Primary Examiner—William H. Beha, Jr.
Attorney, Agent, or Firm—Burns, Doane, Swecker & Mathis

[57] ABSTRACT

A switching regulated power supply, the output voltage of which is regulated according to a pulse width modulation method, is provided with a reference oscillator for generating first and second synchronizing signals, phases of which are complement each other, first and second time constant circuits, to which the first and second synchronizing signals are supplied respectively, each one of the circuits having a resister and a capacity device including a variable capacity diode, charge speed up diodes coupled in parallel with the resisters, first and second CMOS drive circuits for inputting the output signals of the first and second time constant circuits and for providing drive signals according to the output signals, a DC-DC converter having push-pull switching devices driven by the drive signals of said first and second CMOS drive circuits, and a control circuit for detecting an output voltage of the DC-DC converter and for controlling capacitance of the variable capacity diodes of said first and second time constant circuits in response to the output voltage of said DC-DC conveter.

2 Claims, 3 Drawing Sheets

Q OF OSCILLATOR 1

Q OF OSCILLATOR 1

INPUT SIGNAL OF INVERTER 7a

— $V_{tha}$

OUTPUT SIGNAL OF INVERTER 7a

INPUT SIGNAL OF INVERTER 7b

— $V_{thb}$

OUTPUT SIGNAL OF INVERTER 7b

PRIMARY VOLTAGE OF TRANSFORMER T1

— 0V

SWITCHING REGULATED DC-DC CONVERTER USING VARIABLE CAPACITY DIODES IN THE FEEDBACK CIRCUIT

BACKGROUND OF THE INVENTION

1. Field of the Invention

The present invention relates to a switching regulated power supply, the output voltage of which is regulated by a pulse width modulation method.

2. Background Art

Switching regulated power supplies are known which have a transformer, a push-pull type switching circuit connected to the primary coil of the transformer and a rectification circuit connected to the secondary coil of the transformer. FIG. 4 is a circuit diagram showing the basic configuration of this type of switching regulated power supply. Both terminals of the primary coil of a transformer T are connected to a positive polarity power source +B through a pair of switching devices SWa and SWb. An intermediate tap of the primary coil of the transformer is connected to a negative polarity power source −B. The secondary coil of the transformer T is connected to a rectification circuit which is not shown. Switching devices SWa and SWb are implemented in a bi-polar transistor or power MOS-FET (Metal-Oxide-Semiconductor type Field Effect Transistor) for example. Two gate pulses, which complement each other, are respectively supplied to switching devices SWa and SWb so that the switching devices SWa and SWb alternately become on-state.

In order to control the above-described switching regulated power supply so that its output voltage level remains constant, a pulse width modulation control method is used. In the switching regulated power supplies using such a method, the DC output voltage of the rectification circuit is detected, and the pulse width of the both gate pulses supplied to the switching devices SWa and SWb is controlled by means of a feedback of the detecting result so that the output voltage of the rectification circuit maintains a target level.

In the case where a load device connected to the output terminal of the switching regulated power supply consumes a large amount of electric power, the pulse width of the gate pulses becomes large. As a result, an emergency state can be created in which both switching devices SWa and SWb are in on-state simultaneously, and the primary coil and the switching devices SWa and SWb form a closed-loop circuit, whereby an extremely large current (hereinafter called "short current") passes through the closed-loop and resulting in an extremely large power-loss. In order to prevent the generation of the short current, the switching devices must be controlled so that one of the switching devices becomes on-state after the other has become off-state. Switching regulated power supplies must provides complicated signal processing including a gate pulse generation function capable of preventing the generation of the above-described short current. For that reason, a specificated bi-polar transistor IC (integrated circuit), for example, μPC494 product by Nippon Electric Co., LTD. in Japan, is employed in switching regulated power supplies in order to execute the above-described complicated signal processing.

The specificated bi-polar transistor IC provides an oscillator, and the production of the gate pulses to be supplied to the switching devices is based on the output clock pulse of the oscillator. However, the upper limit of oscillation frequency of oscillators is low, and the oscillation frequency restricts the switching frequency of switching regulated power supplies to a range of approximately 10 kHz up to 100 kHz. In addition, the bi-polar transistor IC consumes a large amount of electric power. Furthermore, the configuration of the circuit of the specificated bi-polar transistor IC is complicated and therefore costly.

SUMMARY OF THE INVENTION

In consideration of the above, it is an object of the present invention to provide a switching regulated power supply having the following advantages:

a. simple configuration
b. high speed switching operation
c. low power consumption
d. regulation function using a pulse width modulation method which prevents the generation of a short current So as to achieve the above described object, the present invention provides a switching regulated power supply comprising:

a reference oscillator for generating first and second synchronizing signals, the phases of which complement each other, said reference oscillator having a CMOS configuration;

first and second time constant circuits, to which said first and second synchronizing signals are respectively supplied, each of the circuits having a resister and a capacity device including a variable capacity diode;

charge speed up diodes coupled in parallel with said resisters;

first and second CMOS drive circuits for inputting output signals of said first and second time constant circuits and for providing drive signals according to said output signals;

DC-DC converter having push-pull switching devices driven by said drive signals of said first and second CMOS drive circuits; and, control means for detecting an output voltage of said DC-DC converter and for controlling capacitance of said variable capacity diodes of said first and second time constant circuits in response to the output voltage of said DC-DC converter.

In the first and second time constant circuits, charge operation and discharge operation are performed alternately in synchronization with the corresponding synchronizing signals. When charging operation, the capacity device of each time constant circuit is suddenly charged via the corresponding speed up diode. When discharge operation, the electric charge previously charged in the capacity device is discharged via the resister device. The first and second time constant circuits provide two phase signals, the phases of which complement each other, and only the rise time of each of which is large. The output signals of the first and second time constant circuits are supplied respectively to the first and second drive circuit. The first and second drive circuit output two phase drive signals, the phase of which are complement each other, and the levels of which are never simultaneously high. These drive signals are supplied respectively to the push-pull switching devises of the DC-DC converter. The capacities of the variable capacity diodes of the first and second time constant circuits are controlled based on the output voltage of the DC-DC converter, and the duties of the drive signals are controlled, whereby the output voltage of the DC-DC converter is regulated.

The other objects and features of this invention will become understood from the following description with reference to the accompanying drawings.

DETAILED DESCRIPTION OF THE PREFERRED EMBODIMENTS

Figure 1:
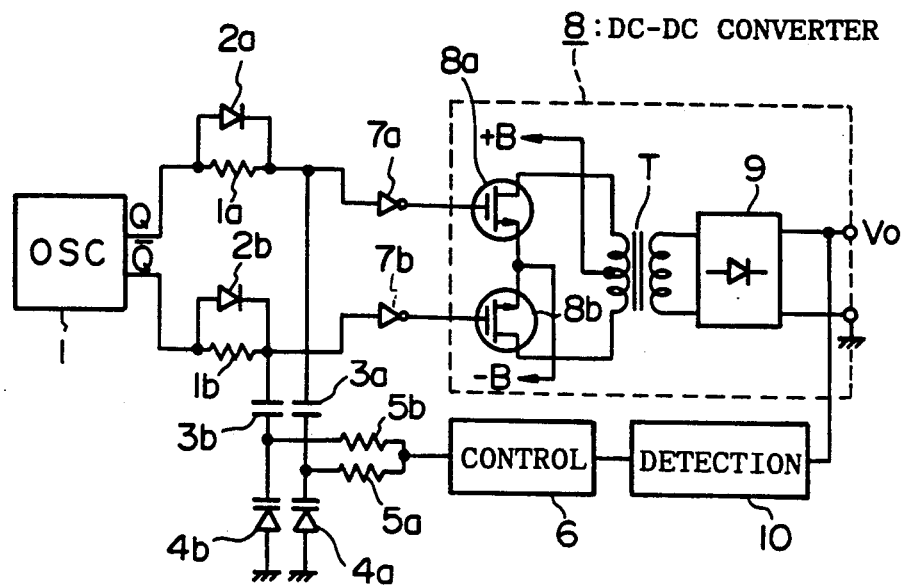
FIG. 1 is a circuit diagram showing the configuration of a switching regulated power supply according to the preferred embodiment of the present invention.
Figure 4:
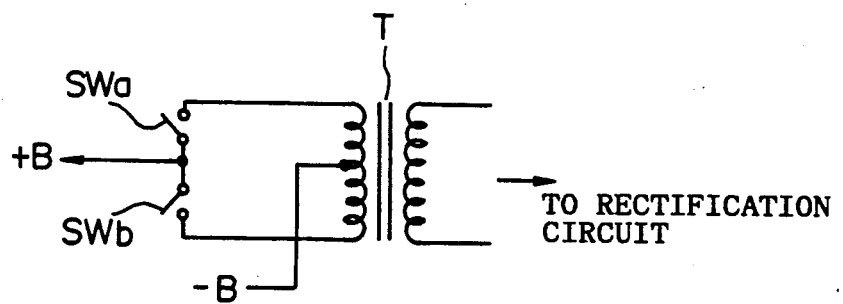
FIG. 4 is a circuit diagram showing a portion of a conventional switching regulated power supply.

FIG. 1 is a circuit diagram showing a preferred embodiment of a switching regulated power supply in accordance with the present invention. A reference oscillator 1 is implemented in CMOS (Complementary Metal Oxide Semiconductor) type field effect transistor. The reference oscillator generates two phase reference pulses, the duty of each of which is approximately 50%, the phase of one of which is shifted by $\pi$ radians in relation to the phase of the other, and the said two phase pulses are output respectively from output terminals Q and $\overline{Q}$. The output terminal Q of oscillator 1 is connected to the cathode of a variable capacity diode 4a via a series circuit consisting of a resister 1a and a capacitor 3a. The anode of the variable capacity diode 4a is grounded. The cathode of the variable capacity diode 4a is also connected to a control circuit 6 via a resister 5a. A control voltage to control the capacity of variable capacity diode 4a is supplied to the cathode from control circuit 6 via the resister 5a. Resister 1a, capacitor 3a and variable capacity diode 4a constitute a first time constant circuit, the time constant of which is controlled by the control voltage supplied by control circuit 6. A charge speed up diode 2a is coupled in parallel with resister 1a in order to shorten the charge time during which the current output from output terminal Q charges capacitor 3a and variable capacity diode 4a after the output voltage of Q is raised. Similarly, a second time constant circuit consisting of a resister 1b, capacitor 3b, and variable capacity diode 4b, is connected to the other output terminal $\overline{Q}$, and a charge speed up diode 2b is coupled in parallel with resister 1b. The time constant of the second time constant circuit is controlled by the control voltage which is supplied from control circuit 6 via a resistor 5b.

The connection point of resister 1a to capacitor 3a, which is an output terminal of the first time constant circuit, is connected to the input terminal of a CMOS inverter 7a. Similarly, the connection point of resister 1b to capacitor 3b, which is an output terminal of the second time constant circuit, is connected to the input terminal of a CMOS inverter 7b. When the input voltage of each CMOS inverter becomes higher than the threshold level thereof, the output voltage thereof falls, whereas when the input voltage becomes lower than the threshold level, the output voltage thereof rises.

A DC-DC converter 8 is constituted by a transformer T, a series of N channel power MOSFET 8a and 8b connected between the terminals of the primary coil of transformer T as push-pull switching devices, and a rectification circuit 9 connected between the terminals of the secondary coil of transformer T.

The two sources of power MOSFET 8a and 8b are connected to a negative polarity power source $-B$. The two drains of power MOSFET 8a and 8b are connected respectively to the two terminals of the primary coil of transformer T. The intermediate tap of transformer T is connected to a positive polarity power source $+B$. Two gates of power MOSFET 8a and 8b are connected respectively to the output terminals of CMOS inverters 7a and 7b. Power MOSFET 8a and 8b are controlled by the output signals of CMOS inverters 7a and 7b so as to become on-state alternately.

A detection circuit 10 monitors the output voltage of rectification circuit 9, and outputs an error signal in response to a difference between the output voltage of rectification circuit 9 and a target voltage. The error signal is supplied to control circuit 6. Based on the error signal, the control circuit 6 supplies the control voltage by which the capacity of the variable capacity diodes 4a and 4b is controlled.

Operation of the switching regulated power supply will be described with reference to FIGS. 2A through 2G. At a time $t_1$, the output voltage of output terminal Q of reference oscillator 1 rises suddenly, and simultaneously the output voltage of output terminal $\overline{Q}$ falls (shown in FIGS. 2A and 2B). The output current of output terminal Q passes through charge speed up diode 2a and the current is accumulated to capacitor 3a and variable capacity diode 4a. Thus, the input voltage of CMOS inverter 7a suddenly rises, and exceeds a threshold level Vtha (shown in FIG. 2C), resulting in a drop in the output voltage of CMOS inverter 7a (shown in FIG. 2D). In contrast, an electric charge which has been previously charged in capacitor 3b and in variable capacity diode 4b is discharged to the output terminal $\overline{Q}$ of reference oscillator 1 via resister 1b. In this case, the input voltage of CMOS inverter 7b falls gradually according to a time constant which is a multiple of the resistance of resistor 1b and the capacity of the series circuit consisting of capacitor 3b and variable capacity diode 4b (shown in FIG. 2E). For this reason, the output voltage of CMOS inverter 7b rises suddenly some time after the output voltage of CMOS inverter 7a has begun to fall (shown in FIG. 2F).

Next, at a time $t_2$, the output voltage of output terminal Q of reference oscillator 1 falls suddenly, and simultaneously the output voltage of output terminal $\overline{Q}$ rises. The output current of output terminal $\overline{Q}$ passes through charge speed up diode 2b and the current is accumulated to capacitor 3b and variable capacity diode 4b. Thus, the input voltage of CMOS inverter 7b suddenly rises, and exceeds a threshold level Vthb (shown in FIG. 2E), resulting in a drop in the output voltage of CMOS inverter 7b (shown in FIG. 2F). In contrast, an electric charge which has been previously charged in capacitor 3a and in variable capacity diode 4a is discharged to the output terminal Q of reference oscillator 1 via resister 1a. In this case, the input voltage of CMOS inverter 7a falls gradually according to a time constant which is determined by a multiplication of the resistance of resistor 1a and the capacity of the series circuit consisting of capacitor 3a and variable capacity diode 4a (shown in FIG. 2C). For this reason, the output voltage of CMOS inverter 7a rises when a few time elapses after the output voltage of CMOS inverter 7b has fallen (shown in FIG. 2D).

Figure 2A:
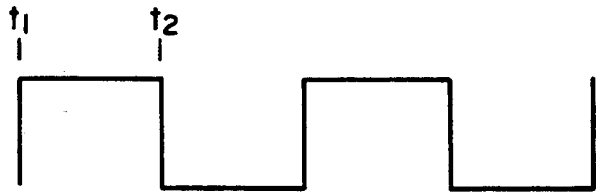
FIGS. 2A through 2G are time charts showing the operation of the switching regulated power supply shown in FIG. 1.
Figure 2B:
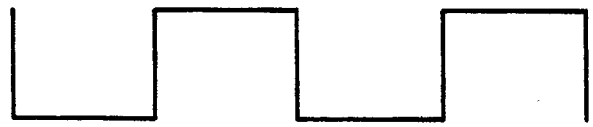
Figure 2C:
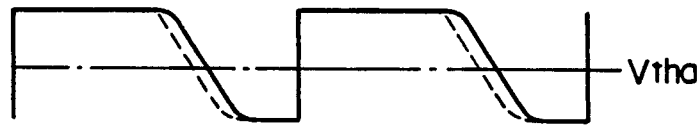
Figure 2D:
Figure 2E:
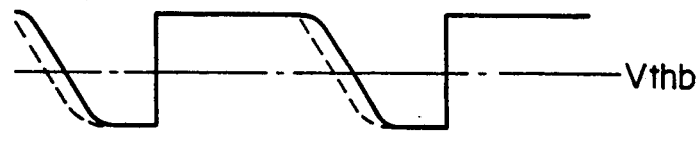
Figure 2F:
Figure 2G:
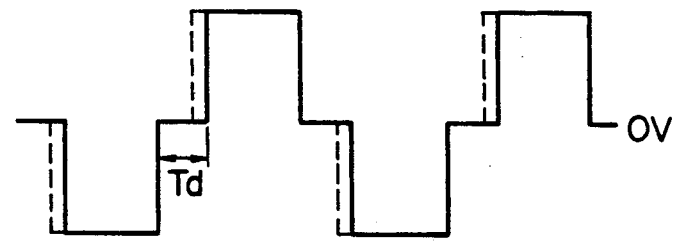

In this manner, two phase pulses, the phases of which complement each other, and the levels of which are never simultaneously high, are output respectively from CMOS inverters 7a and 7b, and the said two phase pulses are supplied respectively to gates of power MOSFET 8a and 8b. As a result, power MOSFET 8a and 8b are set alternately in on-state, and the repeated waveform shown in FIG. 2G is supplied to the primary coil of transformer T. As shown in FIGS. 2D and 2F, power MOSFET 8a and 8b are controlled so that both are not simultaneously in on-state and so as to provide a dead time Td in which neither MOSFET 8a and 8b are in on-state, and no voltage is supplied to the primary coil of transformer T.

In transformer T, the voltage corresponding to the input voltage of the primary coil is induced to the secondary coil. The voltage obtained from the secondary coil is rectified to DC voltage Vo by rectification circuit 9.

The output voltage Vo of rectification circuit 9 is monitored by detection circuit 10. In the case where the output voltage Vo is less than a target voltage to be output, control circuit 6 produce an increase in the control voltage supplied to the cathodes of variable capacity diodes 4a and 4b higher. As a result, the capacity of variable capacity diodes 4a and 4b becomes lower, which causes a decrease in the time constants of first and second time constant circuits. The change in said time constants causes the input voltage waveforms of CMOS inverters 7a and 7b to fall at an earlier time (as indicated by the dotted lines in FIG. 2), which means that the duty of the output rectangle pulses of CMOS inverters 7a and 7b become wide and the dead time Td becomes shorter. As a result, the effective input voltage of the primary coil of transformer T becomes higher, and the effective output voltage of the secondary coil, which is supplied to rectification circuit 9, becomes higher. In this way, the output voltage of rectification circuit 9 is raised. In contrast, in the case where the output voltage Vo is higher than the target voltage to be output, control circuit 6 produces a decrease in the control voltage to be supplied to the cathodes of variable capacity diodes 4a and 4b, and a corresponding increase in the dead time Td.

In this manner, the dead time Td is automatically controlled in response to a change in the output voltage Vo, whereby the said output voltage is regulated.

In the first and the second time constant circuits of the switching regulated power supply, the variable capacity range of both of the capacity series circuits, one of which includes capacitor 3a and variable capacity diode 4a, and the other of which includes capacitor 3b and variable capacity diode 4b, is narrow. However, the output terminals of the first and the second time constant circuits are connected respectively to the input terminals of CMOS inverters 7a and 7b having an extremely high input impedance. For this reason, even if the resistance of resister 1a and 1b is high, there is no variation in the time constants of the first and the second time constant circuits because leakage from the output nodes of these time constant circuits is very low. Accordingly, the time constant of the first and second time constant circuits can be effectively controlled.

In addition, recent improved integrated device technology has resulted in the production of high speed MOS devices. Thus, standard MOS devices having high speed, which can be used for reference oscillator 1, inverters 7a and 7b, power MOSFET 8a and 8b, can be obtained. By employing these high speed standard devices, a high performance switching regulated power supply capable of high speed switching operation can be produced at low cost.

Figure 3:
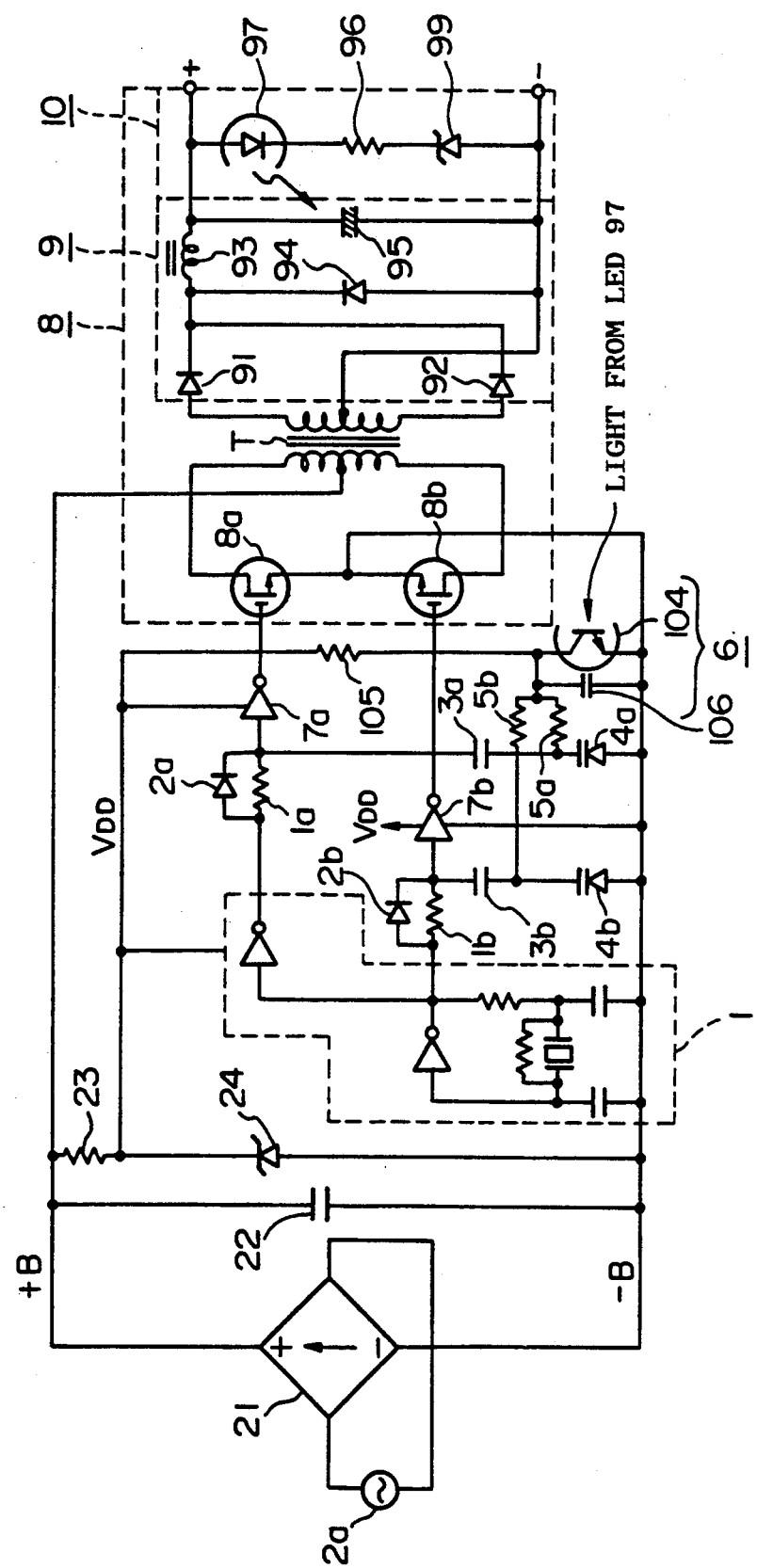
FIG. 3 is a circuit diagram showing the configuration of an AC-DC conversion type high efficiency regulated power supply which makes use of the switching regulated power supply shown in FIG. 1.

FIG. 3 is a circuit diagram showing the configuration of an AC-DC conversion type high efficiency regulated power supply which makes use of the switching regulated power supply of the preferred embodiment. In FIG. 3, parts identical to those in FIG. 1 will be designated by the same character symbols, hence, description thereof will be omitted. An diode bridge circuit 21 is provided for rectification of the alternating voltage of an alternating current power supply 20. The DC voltage is generated between plus output terminal (+) and minus output terminal (−) of the diode bridge circuit 21. A by-pass capacitor 21 is connected between the plus and minus output terminals, whereby a ripple component, included in the output DC voltage generated between the plus and minus output terminals, is eliminated. The output voltage of plus output terminal (+) is supplied to the intermediate tap of the primary coil of transformer T as a positive voltage source +B, and the output voltage of minus output terminal (−) is supplied to both sources of power MOSFET 8a and 8b as a negative voltage source −B. A series circuit in which a resister 23 and a Zener diode 24 are connected in serial, is also connected between the plus and minus output terminals of diode bridge circuit 21. Voltage VDD between the cathode and the anode of Zener diode 24 is supplied to basis oscillator 1 and thus to inverters 7a and 7b which are implemented in CMOS devices. Voltage VDD is also supplied to a series circuit in which a resister 105 and a photodetecting transistor 104 are connected in serial. This series circuit corresponds to control circuit 6 shown in FIG. 1. The voltage between the collector and the emitter of photodetecting transistor 104 is supplied to the cathodes of both the variable capacity diodes 4a and 4b, via resistor 5a and 5b respectively. A capacitor 106 is coupled in parallel with the photodetecting transistor 104, whereby a soft start operation, by which the output voltage of the regulated power supply rises gradually in response to the output of power of said power supply, is performed.

Next, the configuration of rectification circuit 9 will be described. Terminals of the secondary coil of transformer T are connected respectively to the anodes of diodes 91 and 92. Both cathodes of diode 91 and 92 are connected to the same connecting point. A DC voltage is generated between this connecting point and the intermediate tap of the secondary coil of transformer T. The generated DC voltage is averaged by an averaging circuit including a choke coil 93, a diode 94 and a capacitor 95. The averaged DC voltage is obtained between the plus and minus output terminals + and − of DC-DC converter 8.

Next, the configuration of detection circuit 10 will be described. The voltage between the plus and minus output terminals of DC-DC converter 8 is supplied to a series circuit in which a photoemitting diode 97, a resister 96 and a Zener diode 99 are connected together serially. Light emitted by photoemitting diode 97 is transmitted to photodetecting transistor 104.

In the AC-DC conversion type high efficiency regulated power supply, when increasing the output voltage of DC-DC converter 8, the radiation value of photoemitting diode 97 increases. As a result, the resistance between the collector and the emitter of photodetecting transistor 104 decreases, whereby the voltage supplied to variable capacity diode 4a and 4b decreases. Accordingly, the time constants of the first and second time constant circuits increase and the dead time Td is extended. In contrast, when decreasing the output voltage of DC-DC converter 8, the radiation value of photoemitting diode 97 decreases. As a result, the resistance between the collector and the emitter of photodetecting transistor 104 increases, whereby the voltage supplied to variable capacity diode 4a and 4b increases. Accordingly, the time constants of the first and second time constant circuits decrease and the dead time Td is shortened. In this manner, the output voltage is regulated.

What is claimed is:

1. A switching regulated power supply comprising:

a reference oscillator for generating first and second synchronizing signals, phases of which are complement each other, said reference oscillator having a CMOS configuration;

first and second time constant circuits, to which said first and second synchronizing signals are supplied respectively, each one of the circuits having a resister and a capacity device including a variable capacity diode;

charge speed up diodes coupled in parallel with said resisters;

first and second CMOS drive circuits for inputting output signals of said first and second time constant circuits, and for providing drive signals according to said output signals;

a DC-DC converter having push-pull switching devices driven by said drive signals of said first and second CMOS drive circuits; and, a control means for detecting an output voltage of said DC-DC converter and for controlling capacitance of said variable capacity diodes of said first and second time constant circuits in response to said output voltage of said DC-DC converter.

2. A switching regulated power supply according to claim 1 wherein said control means includes:

a detection circuit for generating a optical signal which indicates the change of said output voltage of said DC-DC converter; and a control circuit having a series circuit consisting of a resister and a photodetecting transistor which accepts said optical signal, and where the voltage at the connecting point between said resister and said photodetecting transistor is supplied to said variable capacity diodes so that the capacitance of said variable capacity diodes is controlled.

* * * * *